US011155227B2

(12) United States Patent
Nakamura et al.

(10) Patent No.: US 11,155,227 B2
(45) Date of Patent: *Oct. 26, 2021

(54) OCCUPANT MONITORING DEVICE FOR VEHICLE AND OCCUPANT PROTECTION SYSTEM FOR VEHICLE

(71) Applicant: SUBARU CORPORATION, Tokyo (JP)

(72) Inventors: Ryota Nakamura, Tokyo (JP); Junpei Tokizaki, Tokyo (JP); Masayuki Marubashi, Tokyo (JP); Keita Onishi, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 175 days.

This patent is subject to a terminal disclaimer.

(21) Appl. No.: 16/458,642

(22) Filed: Jul. 1, 2019

(65) Prior Publication Data

US 2020/0094763 A1  Mar. 26, 2020

(30) Foreign Application Priority Data

Sep. 26, 2018  (JP) .............................. JP2018-180060

(51) Int. Cl.
B60R 21/015 (2006.01)
G06K 9/00 (2006.01)
(Continued)

(52) U.S. Cl.
CPC .. *B60R 21/01538* (2014.10); *B60R 21/01542* (2014.10); *B60R 21/01552* (2014.10); *G06K 9/00838* (2013.01); *G06K 9/00845* (2013.01); *H04N 5/2256* (2013.01); *H04N 7/188* (2013.01); *B60R 2021/0048* (2013.01);
(Continued)

(58) Field of Classification Search
CPC ........ B60R 21/01538; B60R 21/01542; B60R 21/01552; B60R 2021/0048; B60R 2021/01211; B60R 2021/01218; B60R 2021/01231; B60R 2021/01238; B60R 2021/01265; B60R 2021/01286;
(Continued)

(56) References Cited

U.S. PATENT DOCUMENTS

2008/0234899 A1* 9/2008 Breed .................. B60N 2/0232
701/47
2009/0092284 A1* 4/2009 Breed .................... B60N 2/002
382/103

FOREIGN PATENT DOCUMENTS

JP  H11-043009   2/1999
JP  2015140146   8/2015

* cited by examiner

*Primary Examiner* — Gertrude Arthur Jeanglaude
(74) *Attorney, Agent, or Firm* — Chip Law Group

(57) ABSTRACT

An occupant monitoring device for a vehicle is configured to monitor an occupant sitting on a seat provided in the vehicle and includes a light projector, an imaging device, and a processor. The light projector is configured to project light toward the occupant sitting on the seat. The imaging device is configured to capture an image of the occupant sitting on the seat. The processor is configured to control the light projector and the imaging device to capture the image of the occupant sitting on the seat. In a case where a collision of the vehicle is neither predicted nor detected, the processor causes the imaging device to capture an image of behavior of the occupant corresponding to either one of travel control and behavior of the vehicle so as to change occupant protection control.

15 Claims, 9 Drawing Sheets

(51) Int. Cl.
*H04N 5/225* (2006.01)
*H04N 7/18* (2006.01)
*G05D 1/02* (2020.01)
*B60R 21/01* (2006.01)
*B60R 21/00* (2006.01)

(52) U.S. Cl.
CPC ............... *B60R 2021/01211* (2013.01); *B60R 2021/01218* (2013.01); *B60R 2021/01231* (2013.01); *B60R 2021/01238* (2013.01); *B60R 2021/01265* (2013.01); *B60R 2021/01286* (2013.01); *G05D 1/021* (2013.01)

(58) Field of Classification Search
CPC ........... G06K 9/00838; G06K 9/00845; H04N 5/2256; H04N 7/188; G05D 1/021
USPC .......................................................... 701/45
See application file for complete search history.

FIG. 10A

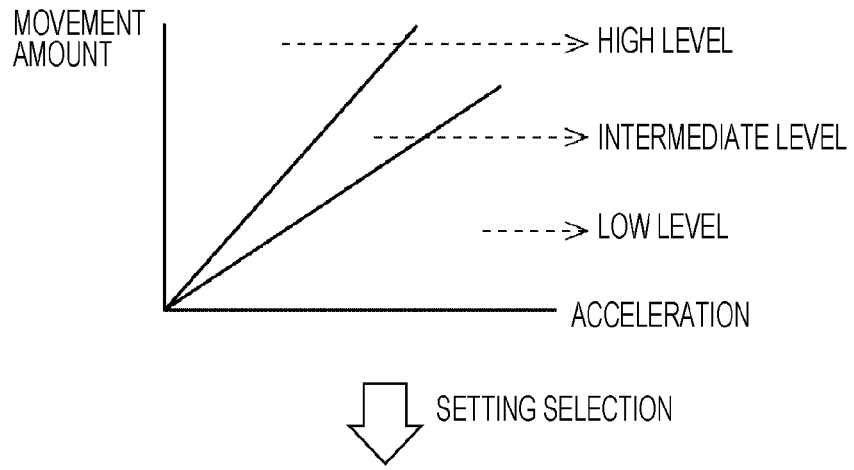

⇩ SETTING SELECTION

FIG. 10B

| PROTECTION LEVEL (LEVEL AT WHICH OCCUPANT IS NOT CAPABLE OF SITTING FIRMLY) | SET VALUE | | | | | |
|---|---|---|---|---|---|---|
| | SEATBELT | | | AIRBAG | | |
| | START TIMING | TENSION | RELEASE TIMING | START TIMING | SPEED OF DEPLOYMENT | FIRMNESS WHEN DEPLOYED |
| HIGH | ADVANCE | HIGHER | DELAY | ADVANCE | ADVANCE | HIGHER |
| INTERMEDIATE | NORMAL | NORMAL | NORMAL | NORMAL | NORMAL | NORMAL |
| LOW | DELAY | LOWER | ADVANCE | DELAY | DELAY | LOWER |

⇩ IMPACT DETECTION

FIG. 10C

| INPUT OF IMPACT | SEATBELT | AIRBAG |
|---|---|---|
| LARGE | ✓ | ✓ |
| SMALL | ✓ | ✗ |

OCCUPANT MONITORING DEVICE FOR VEHICLE AND OCCUPANT PROTECTION SYSTEM FOR VEHICLE

CROSS-REFERENCE TO RELATED APPLICATIONS

The present application claims priority from Japanese Patent Application No. 2018-180060 filed on Sep. 26, 2018, the entire contents of which are hereby incorporated by reference.

BACKGROUND

The disclosure relates to occupant monitoring devices for vehicles and to occupant protection systems for vehicles.

Related Art

Japanese Unexamined Patent Application Publication JP-A No. 11-043009 and Japanese Unexamined Patent Application Publication JP-A No. 2015-140146 each disclose an occupant monitoring device that monitors on-board occupants in vehicles.

SUMMARY

An aspect of the disclosure provides an occupant monitoring device for a vehicle configured to monitor an occupant sitting on a seat provided in the vehicle and including a light projector, an imaging device, and a processor. The light projector is configured to project light toward the occupant sitting on the seat. The imaging device is configured to capture an image of the occupant sitting on the seat. The processor is configured to control the light projector and the imaging device to capture the image of the occupant sitting on the seat. In a case where a collision of the vehicle is neither predicted nor detected, the processor causes the imaging device to capture an image of behavior of the occupant corresponding to either one of travel control and behavior of the vehicle so as to change occupant protection control.

An aspect of the disclosure provides an occupant protection system for a vehicle including the occupant monitoring device and an occupant protection controller. The occupant protection controller is configured to execute the occupant protection control based on the image of the occupant captured by the occupant monitoring device. The occupant protection controller changes settings for an airbag member and a seatbelt member based on the image of the occupant captured by the occupant monitoring device in a state where a collision of the vehicle is neither predicted nor detected. In a case where a collision is detected, the occupant protection controller actuates the airbag member and the seatbelt member in the changed settings.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

FIGS. 10A to 10C illustrate an example of a process for changing the settings for occupant protection control based on a captured image and executing the occupant protection control in the event of a collision based on the settings.

DETAILED DESCRIPTION

Figure 1:
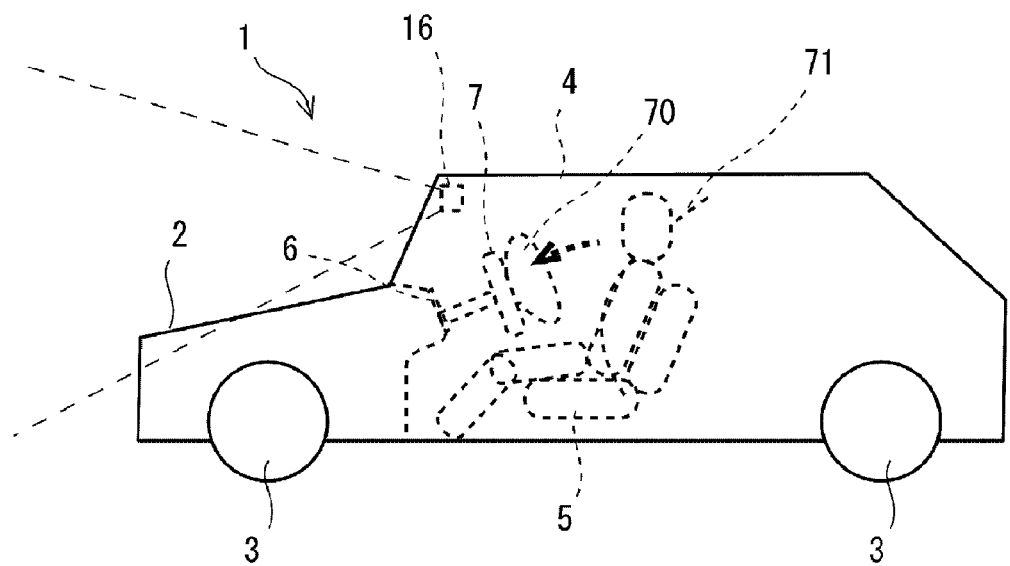
FIG. 1 illustrates occupant protection in an automobile according to an embodiment of the disclosure.

In the following, a preferred but non-limiting embodiment of the disclosure is described in detail with reference to the accompanying drawings. Note that sizes, materials, specific values, and any other factors illustrated in the embodiment are illustrative for easier understanding of the disclosure, and are not intended to limit the scope of the disclosure unless otherwise specifically stated. Further, elements in the following example embodiment which are not recited in a most-generic independent claim of the disclosure are optional and may be provided on an as-needed basis. Throughout the present specification and the drawings, elements having substantially the same function and configuration are denoted with the same reference numerals to avoid any redundant description. Further, elements that are not directly related to the disclosure are unillustrated in the drawings. The drawings are schematic and are not intended to be drawn to scale.

It is conceivable that an image of an occupant is captured in the event of a collision and is utilized for occupant protection control.

However, a vehicle occupant monitoring device is normally provided for warning an occupant sitting on a seat by detecting the level of fatigue, dozing, and inattentive driving of the occupant.

Therefore, the vehicle occupant monitoring device captures an image of the entire upper body of the occupant sitting on the seat and determines the state of the occupant in accordance with, for example, movement of the upper body.

Furthermore, it is conceivable that the vehicle occupant monitoring device is sufficiently practical by simply capturing an image of the occupant about once every several tens of milliseconds to several hundreds of milliseconds.

However, if an image of the entire upper body of the occupant is captured about once every several tens of milliseconds to several hundreds of milliseconds, there is a possibility that the image cannot be sufficiently utilized in occupant protection control in the event of a collision. Specifically, in occupant protection control in the event of a collision, the time from the detection of the collision to the control is short, and it may possibly be difficult to change the settings based on information of the occupant monitoring device within the short period of time.

Accordingly, in the vehicle, it is desirable that the occupant protection control in the event of a collision be further improved based on the image captured by the occupant monitoring device.

FIG. 1 illustrates occupant protection in an automobile 1 according to an embodiment of the disclosure. In FIG. 1, an onboard imaging device 53 that captures a vehicle-interior image is illustrated.

The automobile 1 is an example of a movable automobile 1 that accommodates one or more people. Other examples of the automobile 1 include a large-size vehicle, a two-wheeled vehicle, a personal mobility vehicle, a bicycle, a railway vehicle, an airplane, and a boat.

The automobile 1 in FIG. 1 includes a vehicle body 2, wheels 3 provided at the front and rear of the vehicle body 2, a seat 5 provided in an occupant compartment 4 of the vehicle body 2, a dashboard 6 provided in front of the seat 5, and a steering wheel 7 protruding rearward from the dashboard 6.

In such an automobile 1, an occupant boarding the occupant compartment 4 of the vehicle body 2 sits on the seat 5. Moreover, the occupant operates, for example, the steering wheel 7. The automobile 1 travels in accordance with the operation performed by the occupant by using a driving force of an engine and a motor (not illustrated).

Furthermore, for example, a destination is set in the automobile 1, so that the automobile 1 guides a route to the destination and travels automatically along the route to the destination.

Figure 2:
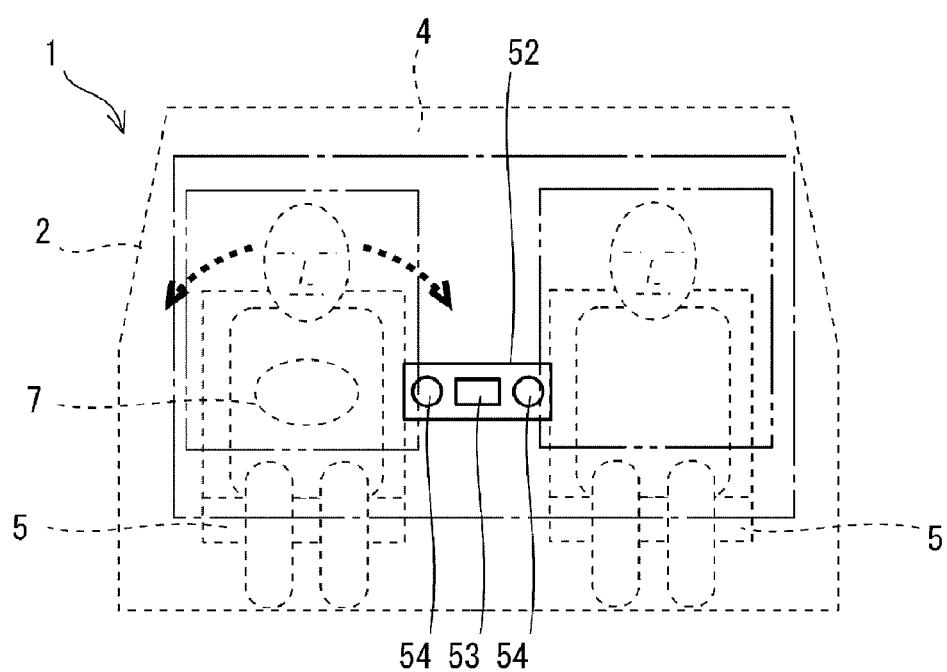
FIG. 2 illustrates the behavior of occupants, in the left-right direction, in the automobile in FIG. 1.

FIG. 2 illustrates the behavior of occupants, in the left-right direction, in the automobile 1 in FIG. 1.

FIG. 2 is a front view of the automobile 1 in FIG. 1 and illustrates two occupants sitting on a pair of left and right seats 5. The upper body of each occupant sitting on the corresponding seat 5 may tilt leftward or rightward on the seat 5 when the automobile 1 makes, for example, a right or left turn.

Figure 3:
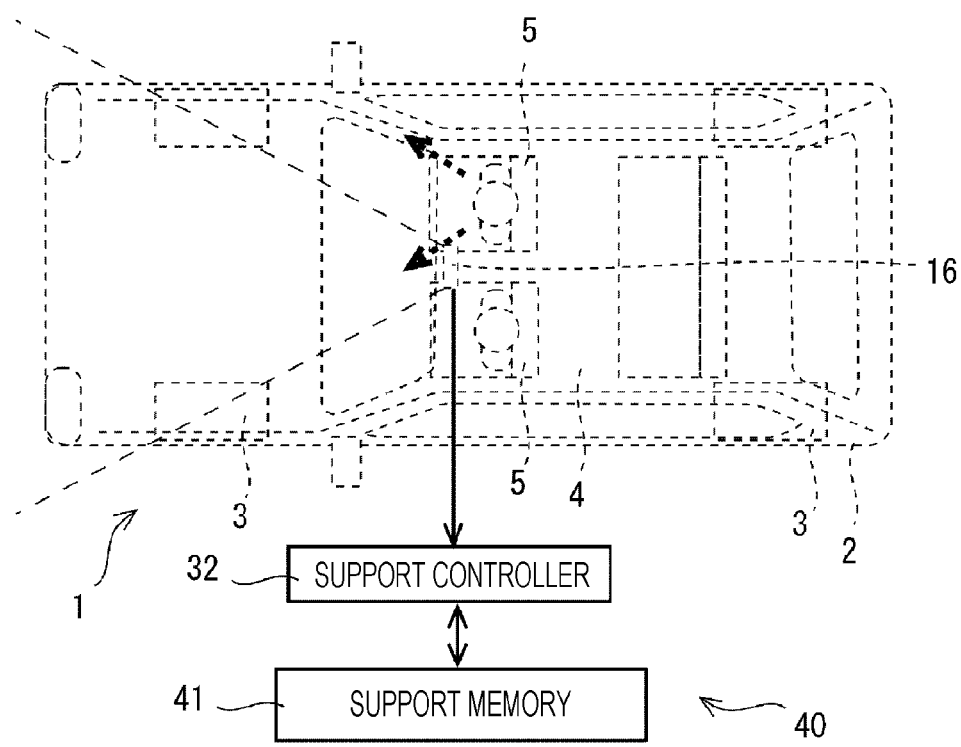
FIG. 3 illustrates the behavior of the occupants, in the diagonally forward direction, in the automobile in FIG. 1.

FIG. 3 illustrates the behavior of the occupants, in the diagonally forward direction, in the automobile 1 in FIG. 1.

FIG. 3 is a top view of the automobile 1 in FIG. 1 and illustrates two occupants sitting on the pair of left and right seats 5. The upper body of each occupant sitting on the corresponding seat 5 may tilt diagonally forward during, for example, braking of the automobile 1.

As illustrated in FIG. 1, the upper body of the occupant sitting on the seat 5 may tilt forward during, for example, braking of the automobile 1.

If excessive acceleration is not applied, the behavior of the upper body of the occupant is not significant.

However, for example, in the event of a collision, an excessive impact occurring during the collision may cause the upper body of the occupant to tilt greatly so as to protrude out from the seat 5.

Therefore, in order to support the upper body of each occupant sitting on the corresponding seat 5, an occupant protection device 60 including an airbag member 70 and a seatbelt member 71, as illustrated in FIG. 1, is used in the automobile 1.

The seatbelt member 71 has a belt extended across the front of the occupant sitting on the seat 5. The seatbelt member 71 actuates a belt actuator 63 in the event of a collision so as to apply tension to the belt. Consequently, in the event of a collision, the upper body of the occupant sitting on the seat 5 is supported by the belt, so that the upper body is less likely to protrude any further from the seat 5.

The airbag member 70 deploys an airbag 64 by using gas generated by an inflator in the event of a collision. In FIG. 1, the airbag 64 deploys at the rear side of the steering wheel 7, that is, in front of the upper body of the occupant sitting on the seat 5. Consequently, the upper body of the occupant tilting forward from the seat 5 abuts on the airbag 64. The airbag 64 deforms due to the load of the occupant, so as to absorb the kinetic energy acting on the upper body of the occupant.

With such an occupant protection device 60, the automobile 1 is capable of protecting the occupants even in the event of a collision.

When the automobile 1 is involved in a collision, it is conceivable that an image of each occupant is captured and is used for occupant protection control.

However, an occupant monitoring device 50 for the automobile 1 is normally provided for warning the occupant sitting on the seat 5 by detecting the level of fatigue, dozing, and inattentive driving of the occupant.

Therefore, the occupant monitoring device 50 for the automobile 1 captures an image of the entire upper body of the occupant sitting on the seat 5 and determines the state of the occupant in accordance with, for example, movement of the upper body.

Furthermore, it is conceivable that the occupant monitoring device 50 for the automobile 1 is sufficiently practical by simply capturing an image of the occupant about once every several tens of milliseconds to several hundreds of milliseconds, similar to a normal moving image.

However, if an image of the entire upper body of the occupant is captured about once every several tens of milliseconds to several hundreds of milliseconds, there is a possibility that the image cannot be sufficiently utilized in occupant protection control in the event of a collision. Specifically, in occupant protection control in the event of a collision, the time from the detection of the collision to the control is short, and it is desirable that the process be completed within the short period of time. If an image of an occupant is to be captured in the event of a collision by using the occupant monitoring device 50 and occupant protection control is to be executed accordingly, it may possibly be difficult to ensure sufficient time for such a process.

Accordingly, in the automobile 1, it is desirable that the occupant protection control in the event of a collision can be improved based on the image captured by the occupant monitoring device 50.

Figure 4:
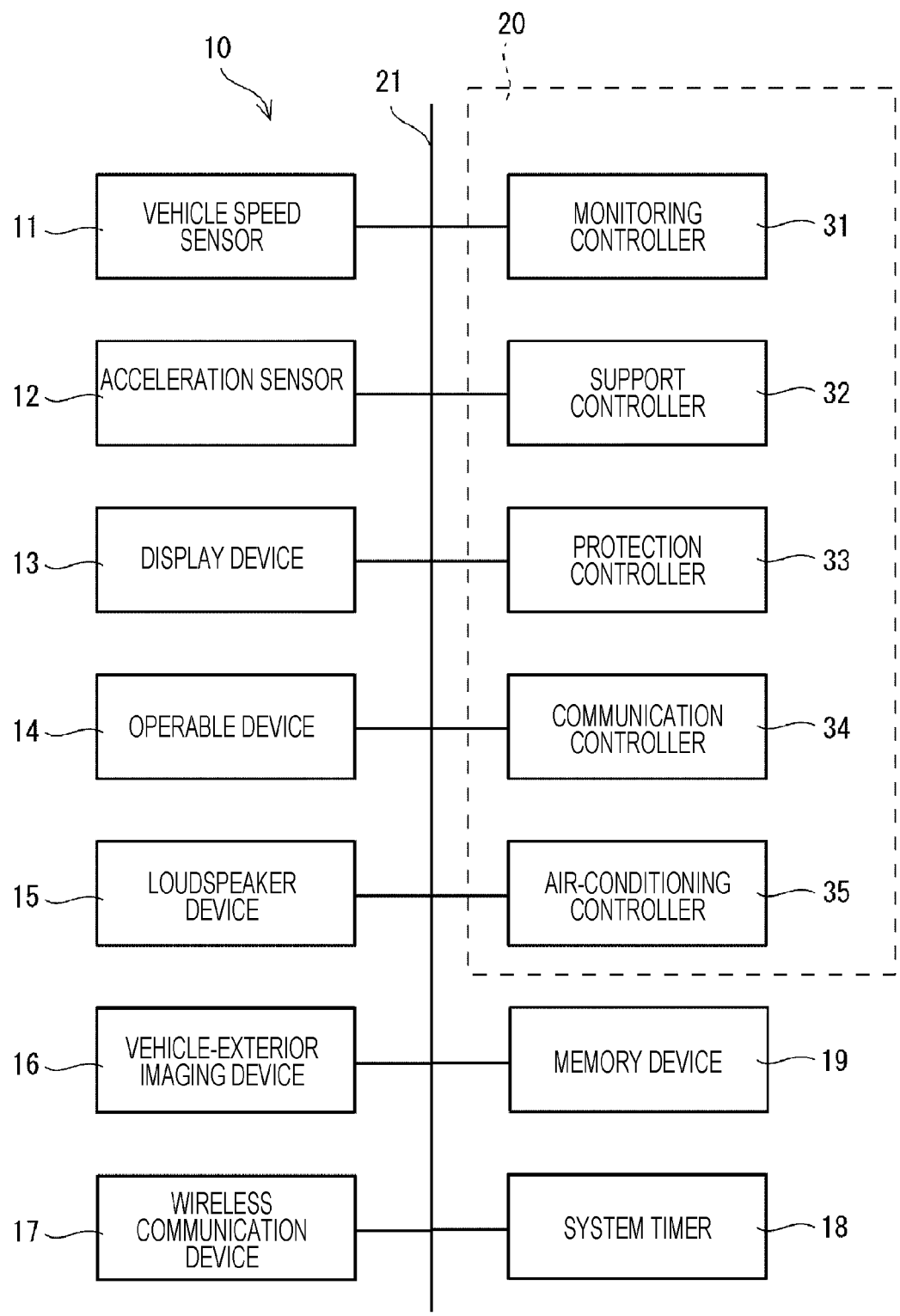
FIG. 4 illustrates a vehicle control system as an occupant protection system provided in the automobile in FIG. 1.

FIG. 4 illustrates a vehicle control system 10 as an occupant protection system provided in the automobile 1 in FIG. 1.

The vehicle control system 10 in FIG. 4 includes a vehicle speed sensor 11, an acceleration sensor 12, a display device 13, an operable device 14, a loudspeaker device 15, a vehicle-exterior imaging device 16, a wireless communication device 17, a system timer 18, a memory device 19, an electronic control unit (ECU) 20, and a vehicle-interior network 21 to which these devices are coupled.

The vehicle-interior network 21 includes, for example, a wired communication network compliant with a controller area network (CAN), a local interconnect network (LIN), and so on. The devices coupled to the vehicle-interior network 21 are distributively disposed at respective locations of the vehicle body 2 and exchange data with one another via the vehicle-interior network 21. The devices coupled to the vehicle-interior network 21 may individually be provided with central processing units (CPUs) for exchanging data via the vehicle-interior network 21, and may each serve as an individual device.

The vehicle speed sensor 11 detects a speed according to, for example, movement of the vehicle body 2 of the automobile 1 and outputs the speed to the vehicle-interior network 21.

The acceleration sensor 12 detects acceleration acting on the vehicle body 2 of the automobile 1 and outputs the acceleration to the vehicle-interior network 21. If impacts input to the vehicle body 2 from a plurality of directions are to be detected, a plurality of acceleration sensors 12 may be provided in the automobile 1 such that they are distributively provided near the outer peripheral surface of the vehicle body 2.

The display device 13 acquires display data from the vehicle-interior network 21 and displays an image based on the display data.

The operable device 14 is provided in, for example, the occupant compartment 4 and is to be operated by the occupant. The operable device 14 includes, for example, the steering wheel 7, a select lever, and a brake pedal.

The loudspeaker device 15 acquires sound data from the vehicle-interior network 21 and outputs sound based on the sound data.

The vehicle-exterior imaging device 16 is provided in, for example, the occupant compartment 4 of the automobile 1, captures an image of the surroundings of the automobile 1, and outputs the image data to the vehicle-interior network 21. For example, the vehicle-exterior imaging device 16 is provided facing forward near the ceiling of the occupant compartment 4, as illustrated in FIG. 1. In this case, the vehicle-exterior imaging device 16 captures an image of the front of the automobile 1.

The wireless communication device 17 communicates wirelessly with, for example, another device not coupled to the vehicle-interior network 21, such as another vehicle located outside the automobile 1, a base station, and a beacon device, and exchanges data therewith.

The system timer 18 measures a time period or a time point. The system timer 18 outputs the measured time period or time point to the devices coupled to the vehicle-interior network 21 via the vehicle-interior network 21. Thus, the plurality of devices coupled to the vehicle-interior network 21 can operate synchronously in accordance with, for example, the time point measured by the system timer 18.

The memory device 19 stores programs and data to be used for vehicle control by the ECU 20. The memory device 19 may be, for example, either one of a semiconductor memory device and a hard disk device.

The ECU 20 is a computer equipped with a CPU, such as a one-chip microcomputer. The one-chip microcomputer may contain the system timer 18 and the memory device 19 in addition to the CPU. The ECU 20 reads and executes a program stored in the memory device 19. Accordingly, a controller that controls the overall operation of the automobile 1 is realized in the ECU 20. The automobile 1 may be provided with a plurality of ECUs 20. In this case, the plurality of ECUs 20 operate in cooperation with each other to function as a controller.

In FIG. 4, an occupant monitoring controller 31, a driving support controller 32, a protection controller 33 for occupants, a communication controller 34, and an air-conditioning controller 35 are illustrated as the functions of the controller realized in the ECU 20.

The communication controller 34 manages data communication performed by the wireless communication device 17 and constitutes a wireless communication apparatus of the automobile 1, together with the wireless communication device 17. The communication controller 34 uses the wireless communication device 17 to exchange data, for controlling the driving of the automobile 1, with, for example, a server device of a traffic system (not illustrated), another vehicle corresponding to the traffic system, and so on.

The air-conditioning controller 35 controls air-conditioning operation in the occupant compartment 4 of the automobile 1.

The driving support controller 32 constitutes a driving support device 40 for the automobile 1, together with the vehicle-exterior imaging device 16 and a support memory 41 in FIG. 3. For example, the support memory 41 may be provided as a part of the memory device 19. Based on the settings of the support memory 41, the support controller 32 extracts structural objects surrounding the automobile 1, such as another vehicle, a pedestrian, a bicycle, a wall, and so on, from a vehicle-exterior image captured by the vehicle-exterior imaging device 16, and generates information about the distance and direction between the automobile 1 and each extracted object. The support controller 32 creates a path of the automobile 1 such that the automobile 1 does not intersect with or come close to the extracted objects and the paths of the objects, and controls the movement of the automobile 1 so that the automobile 1 travels along the created path. In that case, for example, if the occupant operates the operable device 14, such as the steering wheel 7, the support controller 32 assists with the movement of the automobile 1 such that the automobile 1 travels along a complemented path of the path according to the operation of the operable device 14.

Furthermore, the support controller 32 determines a possibility of an unavoidable collision with, for example, another vehicle by performing a process in FIG. 8, to be described later, and predicts a collision if the possibility is high.

Figure 5:
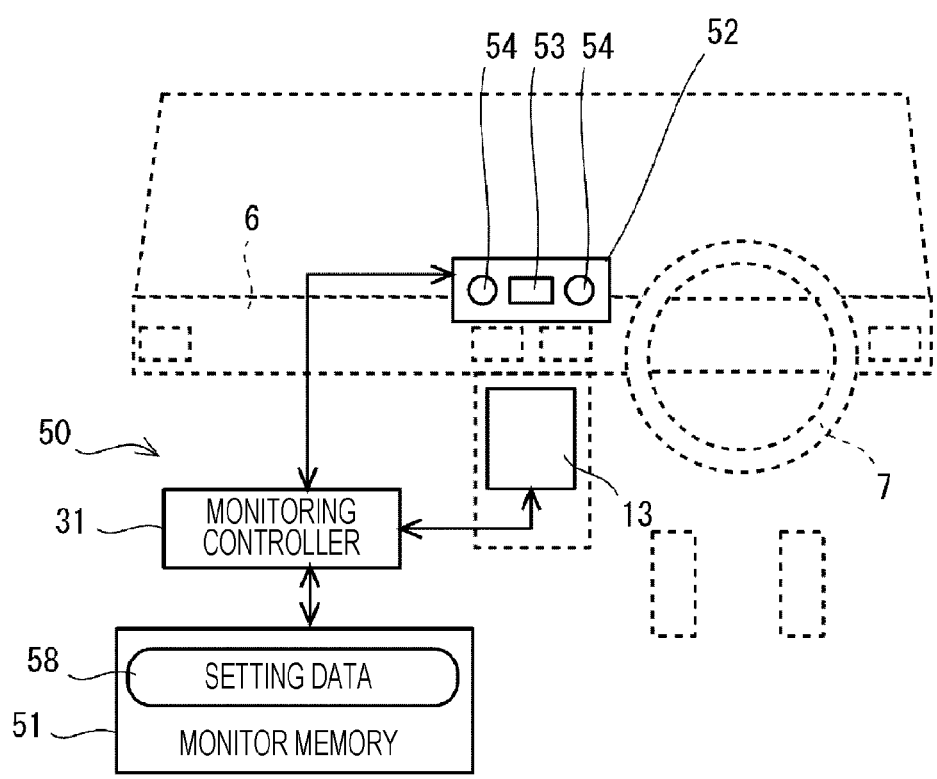
FIG. 5 illustrates an occupant monitoring device provided in the automobile in FIG. 1.

FIG. 5 illustrates the occupant monitoring device 50 provided in the automobile 1 in FIG. 1.

The occupant monitoring device 50 in FIG. 5 includes a monitor memory 51 and an optical unit 52, in addition to the occupant monitoring controller 31 in FIG. 4. The occupant monitoring device 50 monitors the occupants sitting on the seats 5 provided in the automobile 1.

As illustrated in FIGS. 5 and 2, the optical unit 52 is provided facing rearward in a central region of the dashboard 6 in the occupant compartment 4. The optical unit 52 includes the onboard imaging device 53 and a pair of light projectors 54.

The onboard imaging device 53 is provided facing rearward in the central region of the dashboard 6 in the occupant compartment 4. As indicated by a single-dot chain frame in FIG. 2, the onboard imaging device 53 captures an image of the entire upper bodies of the two occupants sitting on the pair of left and right seats 5 provided side-by-side in the vehicle-width direction for the respective occupants in the occupant compartment 4. Normally, the onboard imaging device 53 performs imaging at, for example, 30 frames per second, similar to a normal moving image. The onboard imaging device 53 normally captures an image of the occupants about once every several tens of milliseconds to several hundreds of milliseconds. Alternatively, the onboard imaging device 53 may perform imaging at, for example, a maximum of 120 frames per second that is higher than in the normal mode.

Each light projector 54 is provided facing rearward in the central region of the dashboard 6 in the occupant compartment 4. As indicated by a two-dot chain frame in FIG. 2, each light projector 54 projects nonvisible light, such as infrared light, onto the entire upper body of the occupant who is sitting on the corresponding seat 5 and whose image is to be captured by the onboard imaging device 53. For capturing the image of the faces of the occupants, the light projectors 54 are provided forward of the seated positions on the seats 5.

For example, the monitor memory 51 may be provided as a part of the memory device 19. The monitor memory 51 stores, for example, setting data 58 used for monitoring the occupants.

Figure 7:
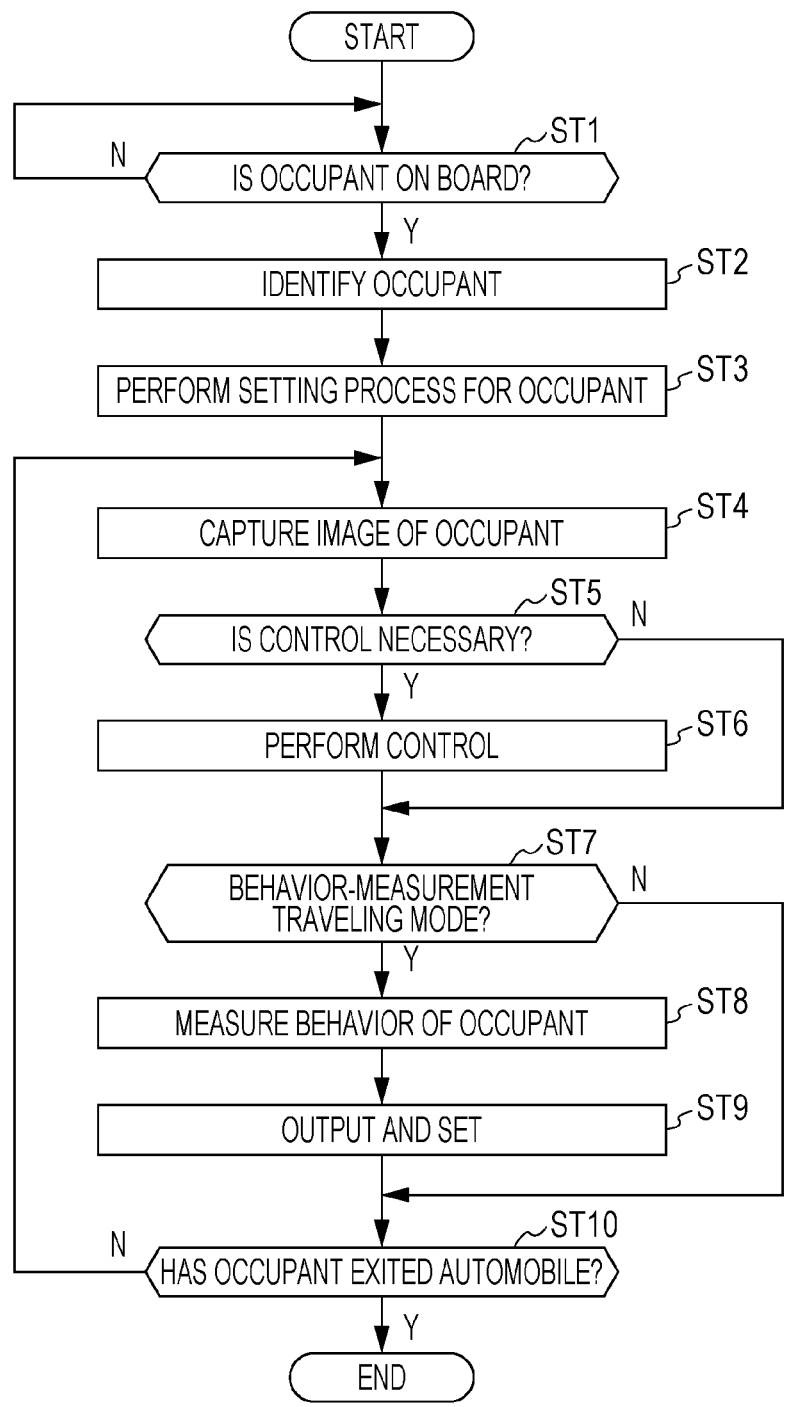
FIG. 7 is a flowchart illustrating a process performed by a monitoring controller in FIG. 5.

As illustrated in FIG. 7 to be described later, during normal driving, the monitoring controller 31 controls the light projectors 54 and the onboard imaging device 53 based on the setting data 58 in the monitor memory 51, determines the position and movement of the upper body of each occupant sitting on the corresponding seat 5 from a vehicle-interior image captured by the onboard imaging device 53, and determines whether the occupant is dozing or driving inattentively in accordance with the position and movement of the upper body. If the occupant is dozing or driving inattentively, the monitoring controller 31 uses the display device 13 and the loudspeaker device 15 to output a warning. Alternatively, the monitoring controller 31 may determine the orientation of the occupant's face and the movement of the occupant's eyes from the captured image and may output a warning about dozing or inattentive driving accordingly.

Figure 6:
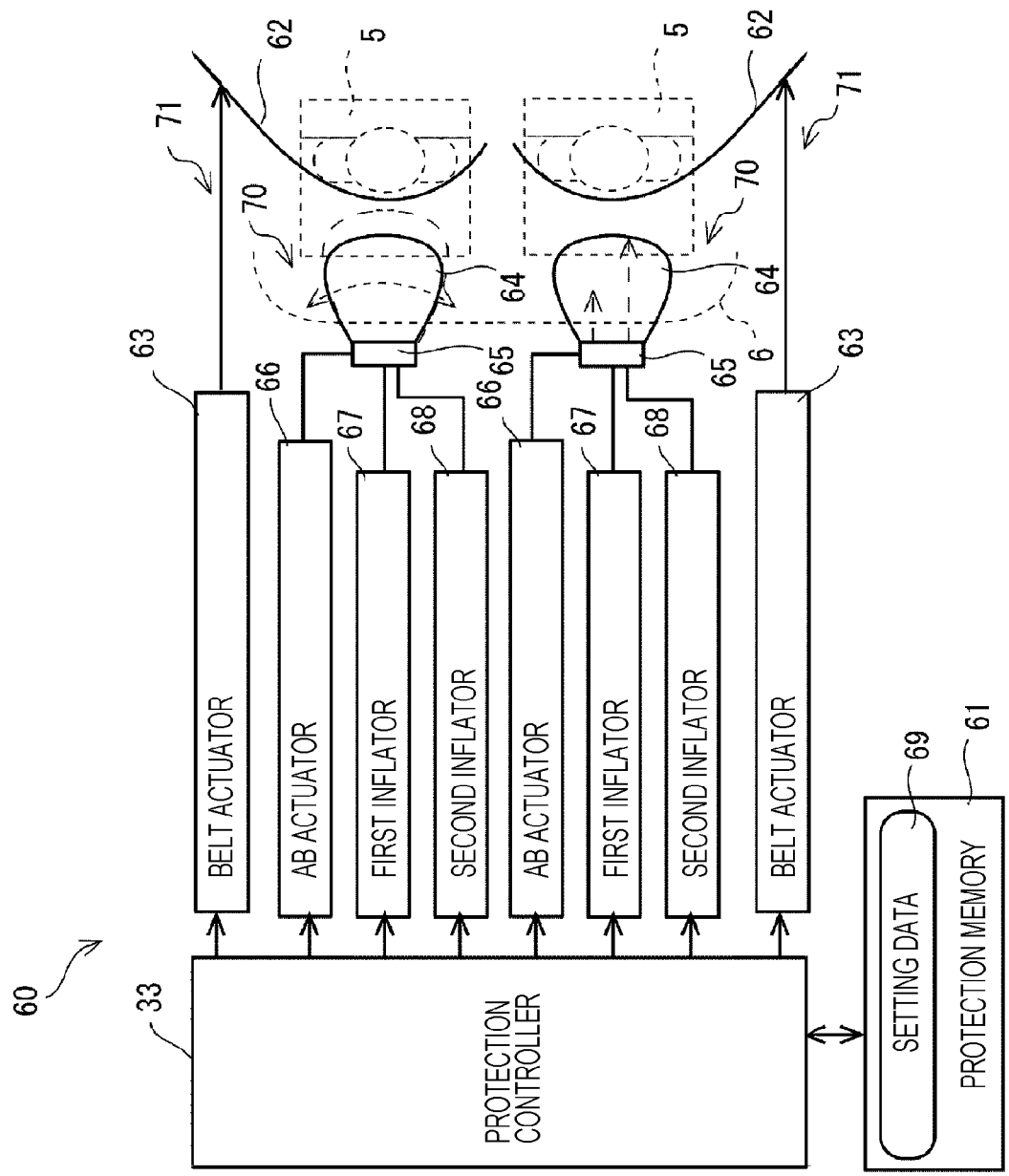
FIG. 6 illustrates an occupant protection device provided in the automobile in FIG. 1.

FIG. 6 illustrates the occupant protection device 60 provided in the automobile 1 in FIG. 1.

The occupant protection device 60 in FIG. 6 includes a protection memory 61, a plurality of seatbelts 62, a plurality of belt actuators 63, a plurality of airbags 64, a plurality of base members 65, a plurality of airbag actuators (AB actuators) 66, and a plurality of inflators 67 and 68, in addition to the protection controller 33 for the occupants in FIG. 4.

One set of a seatbelt 62 and a belt actuator 63 constitutes a single seatbelt member 71.

One set of an airbag 64, a base member 65, an airbag actuator 66, a first inflator 67, and a second inflator 68 constitutes a single airbag member 70.

In other words, in FIG. 6, two sets of seatbelt members 71 and two sets of airbag members 70 are illustrated in correspondence with the pair of left and right seats 5.

Each seatbelt 62 is a belt extended across the front of the waist and the upper body of the occupant sitting on the corresponding seat 5.

Each belt actuator 63 applies variable tension to the corresponding seatbelt 62. The seatbelt 62 receiving the tension may function to press the waist and the upper body of the occupant against the seat 5.

The airbags 64 are bags that are deployed instantaneously by high-pressure gas.

The first inflators 67 and the second inflators 68 generate high-pressure gas to be injected into the airbags 64. In a case where the first inflators 67 and the second inflators 68 are both actuated, the airbags 64 can be deployed with high pressure. In a case where the first inflators 67 or the second inflators 68 are actuated, the airbags 64 can be deployed with low pressure. By starting the operation of the first inflators 67 and the operation of the second inflators 68 at different timings, the airbags 64 can be deployed with a pressure change different from that when the inflators are actuated at the same timing.

Each base member 65 has the corresponding airbag 64 attached thereto and accommodates the airbag 64 in a folded state. The first inflators 67 and the second inflators 68 may also be provided in the base members 65.

Each airbag actuator 66 drives the corresponding base member 65 and adjusts either one of the position and the orientation of the base member 65. If the base member 65 is attached to the vehicle body 2 in a movable manner in, for example, the vehicle-width direction, the front-rear direction, and the up-down direction, the airbag actuator 66 slidably drives the base member 65 to adjust the position thereof.

If the base member 65 is provided in a rotatable manner at the attached position, the airbag actuator 66 rotatably drives the base member 65 to adjust the orientation thereof.

For example, the protection memory 61 may be provided as a part of the memory device 19. The protection memory 61 stores, for example, setting data 69 used for protecting the occupants.

The protection controller 33 for the occupants constitutes the occupant protection device 60 of the automobile 1, together with the acceleration sensor 12, and the airbag member 70 and the seatbelt member 71 illustrated in FIG. 1. When the protection controller 33 determines that the acceleration sensor 12 has detected acceleration exceeding a threshold value corresponding to an impact of a collision based on the settings in the memory device 19, the protection controller 33 executes protection control for the occupants. In order to protect each occupant, the protection controller 33 deploys the airbag 64 of each airbag member 70 and applies tension to the seatbelt 62 of each seatbelt member 71.

If a collision of the automobile 1 is predicted, the protection controller 33 executes occupant protection control based on an occupant image captured by the occupant monitoring device 50.

FIG. 7 is a flowchart illustrating a process performed by the monitoring controller 31 in FIG. 5.

When the power of the vehicle control system 10 in FIG. 4 is turned on as a result of an occupant boarding the automobile 1, the monitoring controller 31 repeatedly executes the process in FIG. 7.

In step ST1 of the normal monitoring control in FIG. 7, the monitoring controller 31 determines whether an occupant has boarded the automobile 1. The monitoring controller 31 repeats step ST1 until the monitoring controller 31 determines that an occupant has boarded the automobile 1.

When an occupant boards the automobile 1 and sits on the corresponding seat 5, the onboard imaging device 53 periodically repeats imaging, thereby capturing an image of the occupant sitting on the seat 5.

In step ST2, the monitoring controller 31 uses, for example, the setting data 58 for the occupant stored in the monitor memory 51 so as to identify the face of the occupant appearing in the image captured by the onboard imaging device 53.

In step ST3, the monitoring controller 31 uses, for example, the setting data 58 for the occupant stored in the monitor memory 51 so as to execute a setting process corresponding to the identified occupant. The monitoring controller 31 outputs either one of an identification number of the recognized occupant and the setting data 58 to the vehicle-interior network 21. Accordingly, for example, the operable device 14 adjusts the steering wheel 7 to a previously set position for the recognized occupant, the support controller 32 performs a driving-support setting process corresponding to the past driving history of the recognized occupant, the protection controller 33 performs a protection-control setting process corresponding to the recognized occupant, the air conditioner starts air-conditioning operation in accordance with past settings designated by the recognized occupant, and so on.

After the above-described setting process performed at the time of boarding, the support controller 32 starts to monitor the occupant.

In step ST4, the monitoring controller 31 causes each light projector 54 to emit light in accordance with normal light projection control. In normal light projection, the monitoring controller 31 causes the light projector 54 to intermittently emit light such that the light is output steadily in a continuously lit manner over a long period of time. By emitting light intermittently, the light projector 54 starts to project infrared light at a wide angle to the entire upper body of the occupant.

In step ST5, the monitoring controller 31 causes the onboard imaging device 53 to capture an image of the occupant sitting on the seat 5. The onboard imaging device 53 captures the image of the occupant sitting on the seat 5 at a normal imaging rate.

In step ST6, the monitoring controller 31 determines whether a warning is necessary based on the state of the occupant appearing in the captured image. The monitoring controller 31 identifies the position and movement of the upper body of the occupant in the captured image, and determines whether the occupant is dozing or driving inattentively in accordance with the identified position and movement of the upper body. If the occupant is neither dozing nor driving inattentively, the monitoring controller 31 determines that a warning is not necessary and causes the process to proceed to step ST8. If the occupant is dozing and driving inattentively, the monitoring controller 31 determines that a warning is necessary and causes the process to proceed to step ST7.

In step ST7, the monitoring controller 31 determines whether the current traveling mode of the automobile 1 is a predetermined behavior-measurement traveling mode usable in occupant protection control.

A behavior-measurement traveling mode is, for example, a traveling mode resembling a case where the automobile 1 is involved in a major collision.

For example, a mode in which the automobile 1 is stopped by sudden braking in either one of a self-driving mode and a driving-support mode without being operated by the occupant resembles a mode in which the automobile 1 is involved in a major collision. In this case, the upper body and the head of the occupant conceivably behave in a manner similar to a case where the automobile 1 is involved in a major collision.

Furthermore, for example, in a state where large acceleration acts on the automobile 1, it is conceivable that relatively large acceleration acts on the occupant and causes the upper body and the head of the occupant to behave in the above-described manner, although the acceleration is not as large as that when the automobile 1 is stopped by sudden braking. Specific conceivable examples include a case where the automobile 1 accelerates or decelerates suddenly, a case where the automobile 1 accelerates or decelerates during a steady traveling mode, a case where the automobile 1 mistakenly moves forward, and a case where the automobile 1 mistakenly moves rearward. It is conceivable that such examples resemble a case where the automobile 1 is involved in a minor collision.

For example, the monitoring controller 31 compares acceleration acting on the automobile 1 with a threshold value so as to distinguish a case resembling a major collision, a case resembling a minor collision, and other cases from one another.

In a case resembling a major collision and in a case resembling a minor collision, the monitoring controller 31 determines that the automobile 1 is in the predetermined behavior-measurement traveling mode, and causes the process to proceed to step ST8.

In other cases, the monitoring controller 31 determines that the automobile 1 is not in the predetermined behavior-measurement traveling mode, and causes the process to proceed to step ST10.

In step ST8, the monitoring controller 31 measures the actual behavior of the occupant based on the image captured by the onboard imaging device 53.

For example, the monitoring controller 31 clips out the imaging range of the head of the occupant from the image captured in step ST4 and measures the position and movement of either one of the upper body and the head of the occupant in the occupant compartment 4 based on the imaging position of either one of the upper body and the head in the clipped regional image. The monitoring controller 31 measures the behavior of the occupant corresponding to either one of behavior-measurement travel control and behavior of the automobile 1 from the captured image. The behavior of the occupant decreases when the occupant is capable of sitting firmly, and increases when the occupant is not capable of sitting firmly.

Furthermore, based on the measured behavior of either one of the upper body and the head of the occupant, the monitoring controller 31 may predict the behavior of the occupant in a case where a collision actually occurs. In this case, the monitoring controller 31 may increase and decrease the behavior of the occupant in accordance with a ratio of acceleration in the current behavior of the automobile 1 to acceleration that may occur in the actual collision.

Moreover, the monitoring controller 31 may determine whether the occupant is capable of sitting firmly during the collision based on the measured, increased, or decreased behavior of either one of the upper body and the head of the occupant.

Alternatively, the monitoring controller 31 may measure the behavior of the occupant based on a prediction in accordance with the amount of movement of the occupant's eyes in a predetermined vehicle mode.

For example, the monitoring controller 31 may measure the behavior of the occupant based on a prediction in accordance with the amount of movement of the occupant's eyes when sound is released by a sound creator, the amount of movement of the occupant's eyes when the automobile 1 moves from a well-lit location to a dark location and vice versa. Consequently, behavior measurement according to the awareness level of the occupant can be performed.

In step ST9, the monitoring controller 31 outputs various pieces of information acquired in step ST8 as occupant behavior information. Furthermore, the monitoring controller 31 may update, where appropriate, the setting data 58 in the monitor memory 51 based on the occupant behavior information.

In step ST10, the monitoring controller 31 determines whether the occupant has exited the automobile 1. When the occupant no longer appears in the image captured by the onboard imaging device 53, the monitoring controller 31 determines that the occupant has exited the automobile 1. If the occupant has not exited the automobile 1, the monitoring controller 31 causes the process to return to step ST4. The monitoring controller 31 repeats the above-described monitoring process for the occupant who has not exited the automobile 1 based on a subsequent image captured by the onboard imaging device 53. When the occupant has exited the automobile 1, the monitoring controller 31 ends the process in FIG. 7.

Figure 8:
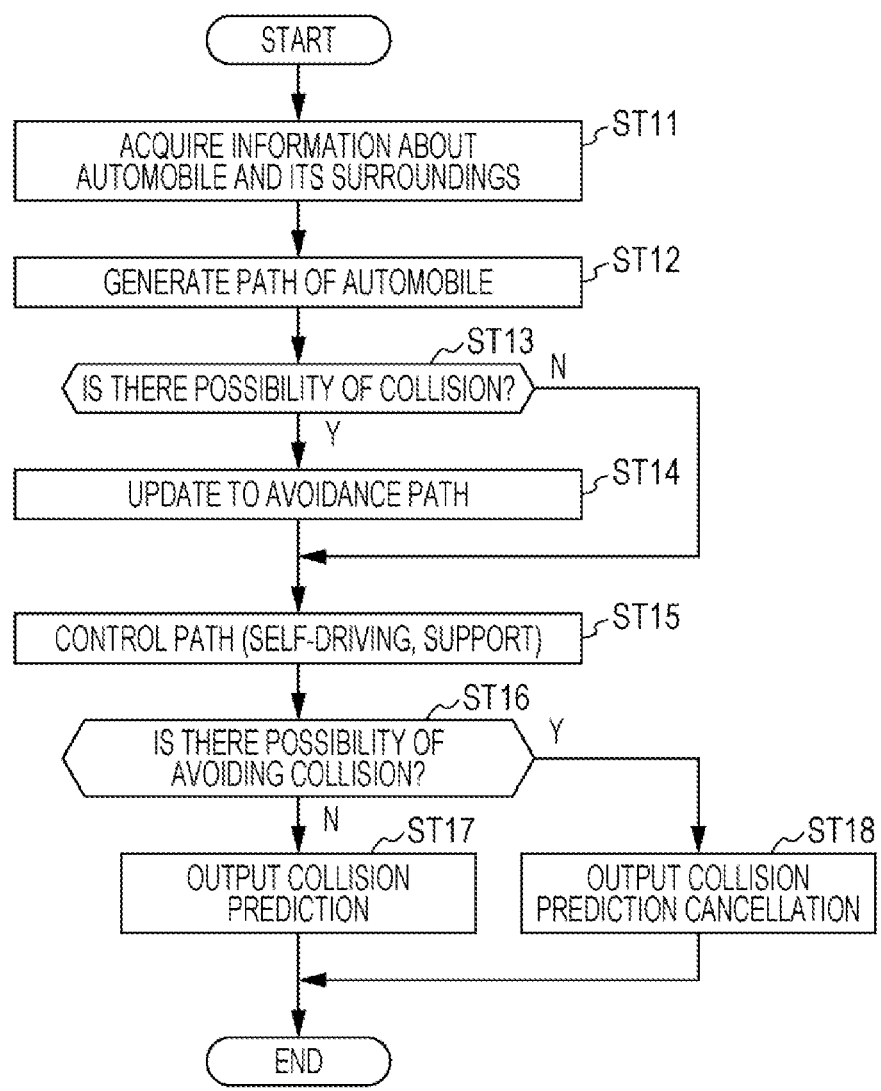
FIG. 8 is a flowchart illustrating a process performed by a support controller of a driving support device in FIG. 3.

FIG. 8 is a flowchart illustrating a process performed by the support controller 32 of the driving support device 40 in FIG. 3.

The support controller 32 repeats the process in FIG. 8 in a period in which the automobile 1 is running or has stopped.

In step ST11 of the driving support control in FIG. 8, the support controller 32 acquires information about the automobile 1 and its surroundings. For example, the support controller 32 acquires an image captured by the vehicle-exterior imaging device 16, movement data of another vehicle acquired by the communication controller 34 from the traffic system, a speed from the vehicle speed sensor 11, acceleration from the acceleration sensor 12, and path and route information from the support controller 32.

In step ST12, the support controller 32 generates a path of the automobile 1 based on the acquired information about the driving of the automobile 1. For example, the support controller 32 generates a most recent path based on the route information of the automobile 1.

In step ST13, the support controller 32 determines whether there is a possibility of a collision between another moving object, such as another vehicle, and the automobile 1. For example, the support controller 32 generates a path of the moving object from either one of the captured image and the movement data and determines whether the path of the moving object intersects with or comes close to the most recent path of the automobile 1. Then, if the most recent path of the automobile 1 and the path of the moving object intersect with or come close to each other, the support controller 32 determines that there is a possibility of a collision, and causes the process to proceed to step ST14. If the most recent path of the automobile 1 and the path of the moving object do not intersect with or come close to each other, the support controller 32 determines that there is no possibility of a collision, and causes the process to proceed to step ST15.

In step ST14, the support controller 32 updates the path generated in step ST12 such that the path is less likely to intersect with or come close to the path of the moving object. The support controller 32 updates the generated path such that, for example, the automobile 1 accelerates, decelerates, and stops along the path.

In step ST15, the support controller 32 controls the driving of the automobile 1 in accordance with the generated or updated path. The support controller 32 prioritizes the updated path over the generated path. If the automobile 1 is traveling in a self-driving mode, the support controller 32 causes the automobile 1 to travel along the generated or updated path. If the occupant operates the operable device 14, such as the steering wheel 7, the support controller 32 adjusts the operational amount in accordance with the generated or updated path, and causes the automobile 1 to travel accordingly.

In step ST16, the support controller 32 determines whether there is a possibility of avoiding a collision in a controlled driving mode. The support controller 32 acquires information from a sensor of the automobile 1, such as a most recent image captured by the vehicle-exterior imaging device 16, and determines whether there is a possibility of avoiding a collision with another moving object. Since the automobile 1 normally moves in accordance with the path updated in step ST14 to avoid a collision, the automobile 1 is capable of avoiding a collision with the moving object. However, for example, if the moving object moves unexpectedly, there is a possibility of a collision even if the automobile 1 moves in accordance with the updated path. The support controller 32 determines whether there is a possibility of avoiding a collision in accordance with, for example, relative movement of the moving object appearing in the captured image. The process of determining whether there is a possibility of avoiding a collision in step ST16 is stricter than the process of predicting a possibility of a collision in step ST14 and is for determining a possibility of whether a collision may actually occur. If there is no possibility of avoiding a collision, the support controller 32 causes the process to proceed to step ST17. If there is a possibility of avoiding a collision, the support controller 32 causes the process to proceed to step ST18.

In step ST17, the support controller 32 outputs a collision prediction to the vehicle-interior network 21. Subsequently, the support controller 32 ends the driving support control in FIG. 8.

In step ST18, the support controller 32 outputs a collision prediction cancellation to the vehicle-interior network 21. Subsequently, the support controller 32 ends the driving support control in FIG. 8.

According to the above-described process, the support controller 32 outputs a collision prediction in step ST17 if the support controller 32 determines that a collision may actually occur. If the support controller 32 determines that a collision may not actually occur, the support controller 32 outputs a collision prediction cancellation in step ST18.

Figure 9:
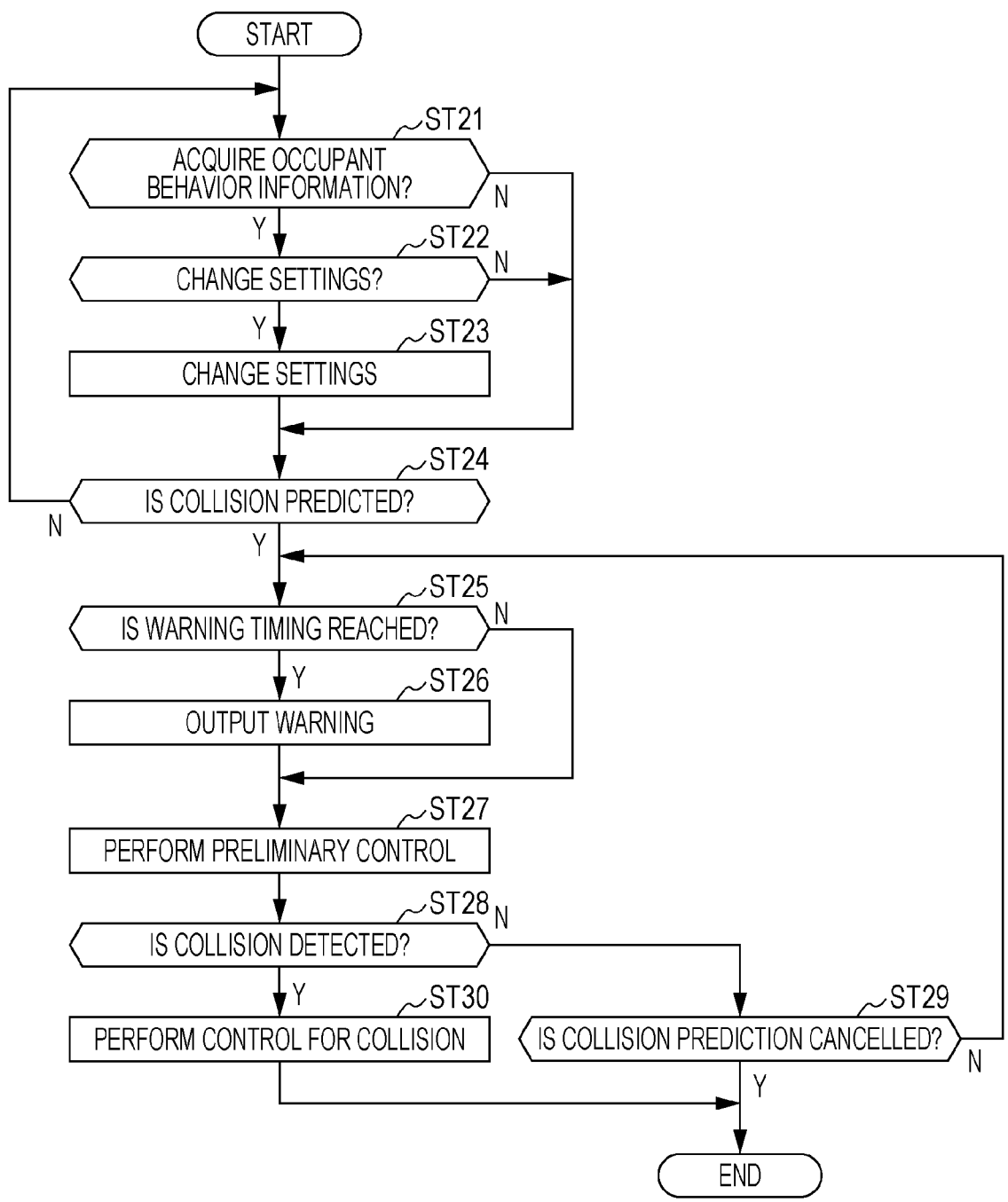
FIG. 9 is a flowchart illustrating a process performed by a protection controller in FIG. 6.

FIG. 9 is a flowchart illustrating a process performed by the protection controller 33 in FIG. 6.

The protection controller 33 for occupants repeats the process in FIG. 9.

In step ST21 of the occupant protection control in FIG. 9, the protection controller 33 determines whether the occupant behavior information output in step ST9 is acquired.

If the occupant behavior information is acquired, the protection controller 33 causes the process to proceed to step ST22.

If the occupant behavior information is not acquired, the protection controller 33 causes the process to proceed to step ST24.

In step ST22, the protection controller 33 determines whether the settings for the occupant protection control are to be changed.

For example, if the setting data 69 in the protection memory 61 is already updated in accordance with the occupant behavior information corresponding to a case resembling a major collision, the protection controller 33 determines that the settings are not to be changed when new occupant behavior information does not correspond to a case resembling a major collision.

If the setting data 69 in the protection memory 61 is updated only in accordance with the occupant behavior information corresponding to a case resembling a minor collision, the protection controller 33 determines that the settings are to be changed in accordance with new occupant behavior information.

Accordingly, the protection controller 33 determines whether the settings are to be changed such that the occupant behavior information corresponding to a case resembling a major collision is prioritized over the occupant behavior information corresponding to a case resembling a minor collision.

If it is determined that the settings are to be changed, the protection controller 33 causes the process to proceed to step ST23.

If it is determined that the settings are not to be changed, the protection controller 33 causes the process to proceed to step ST24.

In step ST23, the protection controller 33 executes a setting changing process for the occupant protection control.

If the protection controller 33 acquires, for example, the occupant behavior information corresponding to a case resembling a major collision, the protection controller 33 determines that the acquired behavior of either one of the upper body and the head of the occupant is the behavior during a collision and executes the setting changing process for the occupant protection control.

If the protection controller 33 acquires, for example, the occupant behavior information corresponding to a case resembling a minor collision, the protection controller 33 expands the acquired behavior of either one of the upper body and the head of the occupant based on a predetermined method, determines that the expanded behavior is the behavior during a collision, and executes the setting changing process for the occupant protection control.

Alternatively, for example, the protection controller 33 may execute the setting changing process for the occupant protection control based on a determination result, included in the occupant behavior information, of whether the occupant is capable of sitting firmly during a collision.

Moreover, the protection controller 33 changes the settings for the airbag member 70 and the seatbelt member 71 in the setting changing process for the occupant protection control.

For example, the protection controller 33 changes the settings with regard to the start timing for actuating the seatbelt member 71, the support strength of the seatbelt member 71, the start timing for releasing the seatbelt member 71, the start timing for deploying the airbag member 70, the position of deployment of the airbag member 70, the direction of deployment of the airbag member 70, the size of deployment of the airbag member 70, the speed of deployment of the airbag member 70, and the firmness of the airbag member 70 when deployed.

In detail, for example, if it is determinable that the behavior of the occupant is small and the occupant is capable of sitting firmly, the protection controller 33 delays the start timing for actuating the seatbelt member 71, increases the support strength of the seatbelt member 71, advances the start timing for releasing the seatbelt member 71, delays the start timing for deploying the airbag member 70, increases the speed of deployment of the airbag member 70, or increases the firmness of the airbag member 70 when deployed. Consequently, the force for supporting the occupant by using the airbag member 70 and the seatbelt member 71 can be increased.

In contrast, if it is determinable that the behavior of the occupant is large and the occupant is not capable of sitting firmly, the protection controller 33 advances the start timing for actuating the seatbelt member 71, decreases the support strength of the seatbelt member 71, delays the start timing for releasing the seatbelt member 71, advances the start timing for deploying the airbag member 70, delays the speed of deployment of the airbag member 70, or decreases the firmness of the airbag member 70 when deployed.

Alternatively, for example, in accordance with the position of either one of the upper body and the head of the occupant, the protection controller 33 changes any one of the position of deployment of the airbag member 70, the direction of deployment of the airbag member 70, and the size of deployment of the airbag member 70 such that the airbag member 70 deploys in a direction and to a position where either one of the upper body and the head of the occupant is expected to tilt in response to an input of a collision.

As another alternative, for example, in a case of a minor collision, the protection controller 33 may change the settings such that the occupant is supported only by the seatbelt member 71.

In step ST24, the protection controller 33 determines whether the collision prediction output in step ST17 is acquired.

If the collision prediction is not acquired, the protection controller 33 causes the process to return to step ST21. The protection controller 33 continues to execute the setting changing process based on the occupant behavior information prior to a collision.

If the collision prediction is acquired, the protection controller 33 causes the process to proceed to step ST25.

In step ST25, the protection controller 33 determines whether a warning timing for a collision prediction is reached.

If the warning timing for a collision prediction is not reached, the protection controller 33 causes the process to proceed to step ST27.

If the warning timing for a collision prediction is reached, the protection controller 33 outputs a warning to the loudspeaker device 15 and the display device 13 in step ST26. Subsequently, the protection controller 33 causes the process to proceed to step ST27.

The warning timing may be set based on the time remaining until a collision occurs when a collision is predicted.

In step ST27, the protection controller 33 executes preliminary control prior to collision detection based on the fact that a collision is predicted.

In preliminary control, for example, the protection controller 33 actuates the belt actuator 63 to pull in the seatbelt 62, thereby causing the seatbelt 62 to come into contact with the occupant.

In step ST28, the protection controller 33 determines whether a collision is detected. For example, the protection controller 33 determines whether a collision is detected based on whether excessive acceleration corresponding to an impact of a collision is detected by the acceleration sensor 12.

If a collision is not detected, the protection controller 33 determines in step ST29 whether the collision prediction is cancelled in step ST18. If the collision prediction is cancelled, the protection controller 33 ends the occupant protection process in FIG. 9. If the collision prediction is not cancelled, the protection controller 33 causes the process to return to step ST25. The protection controller 33 repeats the process from step ST25 to step ST28 until the protection controller 33 determines that a collision is detected or the collision prediction is cancelled. For example, the protection controller 33 changes the settings in accordance with the behavior of the head of the occupant immediately before a collision and executes the preliminary control.

If a collision is detected, the protection controller 33 executes the occupant protection control based on the changed settings in step ST30.

In the control during the collision, for example, the protection controller 33 causes the belt actuator 63 to apply tension to the seatbelt 62 in accordance with the settings. The protection controller 33 actuates the first inflator 67 and the second inflator 68 in accordance with the settings. This causes the airbag 64 to deploy. The kinetic energy of the occupant during the collision may be absorbed by the seatbelt 62 and the airbag 64.

For example, if it is determined that either one of the upper body and the head of the occupant shakes by a predetermined amount or more, the protection controller 33 determines that the occupant is not capable of sitting firmly and quickly actuates the airbag member 70 and the seatbelt member 71 so as to support the occupant with a high support force.

If the protection controller 33 can determine that the occupant can sit firmly from the behavior of either one of the upper body and the head of the occupant in the image captured by the onboard imaging device 53, the protection controller 33 delays the start of actuation of the airbag member 70 and the seatbelt member 71, as compared with a case where the protection controller 33 can determine that the occupant is not capable of sitting firmly, and supports the occupant with a normal support force.

Accordingly, the protection controller 33 changes the settings for the occupant protection control prior to collision detection in accordance with the position and behavior of the head of the occupant whose image is captured by the onboard imaging device 53 when the traveling mode is the behavior-measurement traveling mode. For example, if shaking of either one of the upper body and the head of the occupant based on the captured image can be acquired when the automobile 1 is stopped by braking in either one of a self-driving mode and a driving-support mode, the protection controller 33 can change the settings for the occupant protection control based on the shaking of either one of the upper body and the head of the occupant during the braking operation, and can execute the occupant protection control in accordance with the changed settings. Furthermore, for example, if shaking of either one of the upper body and the head of the occupant based on the captured image is not acquirable when the automobile 1 is stopped by braking in either one of a self-driving mode and a driving-support mode, the protection controller 33 can change the settings for the occupant protection control based on the shaking of either one of the upper body and the head of the occupant in a traveling mode resembling a minor collision in which acceleration of a predetermined value or greater acts on the automobile 1, and can execute the occupant protection control in accordance with the changed settings.

FIGS. 10A to 10C illustrate an example of a process for changing the settings for the occupant protection control based on the captured image and executing the occupant protection control in the event of a collision based on the settings.

FIG. 10A illustrates an example of the correspondence relationship between a movement amount (ordinate axis) as the behavior of the occupant subject to determination based on the captured image and acceleration (abscissa axis) of the automobile 1 when the image is captured.

As illustrated in FIG. 10A, the monitoring controller 31 classifies the behavior of the occupant into three protection levels based on the correspondence relationship between the movement amount and the acceleration. For example, when the acceleration is low and the movement amount is small, the behavior of the occupant is classified as a low level. When the acceleration is high and the movement amount is large, the behavior of the occupant is classified as a high level. Otherwise, intermediate-level behavior is classified as an intermediate level. The monitoring controller 31 outputs information about the occupant protection level as occupant behavior information to the protection controller 33.

FIG. 10B illustrates an example of contents changed in the settings for the occupant protection control according to the occupant protection level. The monitoring controller 31 changes the settings for the occupant protection control in accordance with FIG. 10B based on the information about the occupant protection level acquired from the monitoring controller 31.

For example, if the protection level is high, the monitoring controller 31 changes the settings to increase the level of occupant protection by the seatbelt member 71 and the airbag member 70 in accordance with FIG. 10B.

Alternatively, for example, if the protection level is low, the monitoring controller 31 changes the settings to decrease the level of occupant protection by the seatbelt member 71 and the airbag member 70 in accordance with FIG. 10B.

FIG. 10C illustrates an example of contents of the occupant protection control performed by the monitoring controller 31 when a collision is detected.

If an input of a collision is larger than a threshold value for determining a collision, the monitoring controller 31 actuates the seatbelt member 71 and the airbag member 70 in accordance with the changed settings.

If an input of a collision is smaller than the threshold value for determining a collision, the monitoring controller 31 actuates the seatbelt member 71 alone in accordance with the changed settings.

Accordingly, in this embodiment, by controlling the light projectors 54 and the onboard imaging device 53 for monitoring occupants sitting on the seats 5 provided in the automobile 1, an image of the occupants sitting on the seats 5 is captured. When a collision of the automobile 1 is neither predicted nor detected, an image of the behavior of each occupant corresponding to either one of travel control and behavior of the automobile 1 is acquired and is output to the protection controller 33 of the automobile 1 so that the settings for occupant protection control can be changed. The protection controller 33 of the automobile 1 changes the settings for the airbag member 70 and the seatbelt member 71 based on, for example, an image of each occupant captured in a state where a collision of the automobile 1 is neither predicted nor detected. If a collision is detected, the protection controller 33 actuates the airbag member 70 and the seatbelt member 71 in accordance with the changed settings. Consequently, the protection controller 33 of the automobile 1 may execute the occupant protection control in accordance with the position and behavior of either one of the upper body and the head of the occupant, determined based on an image captured in a state where a collision of the automobile 1 is neither predicted nor detected, corresponding to either one of the travel control and behavior of the automobile 1.

For example, in a case where the captured image indicates that the behavior is small due to the occupant being capable of sitting firmly even during sudden braking, the protection controller 33 of the automobile 1 delays the start timing for deploying the airbag member 70 that deploys when a collision is detected, as compared with a case where the occupant is not capable of sitting firmly. Consequently, appropriate occupant protection can be expected in accordance with the state of the occupant.

Accordingly, in this embodiment, the settings for the occupant protection control are changed before a collision is predicted or detected, so that, when a collision is actually predicted or detected, the protection controller 33 can start the occupant protection control immediately without changing the settings. Similar to the case where the settings are not changed in accordance with the behavior of the occupant, the protection controller 33 can start the occupant protection control immediately when a collision is actually predicted or detected.

In this embodiment, the seatbelt member 71 and the airbag member 70 can be actuated to complement the degree by which the occupant sits firmly.

In this embodiment, in accordance with the position of either one of the upper body and the head of the occupant, any one of the position of deployment of the airbag member 70, the direction of deployment of the airbag member 70, and the size of deployment of the airbag member 70 is changed such that the airbag member 70 deploys in a direction and to a position where either one of the upper body and the head of the occupant is expected to tilt in response to an input of a collision. Thus, even in a case where the occupant is not sitting in an ideal state on the seat 5, the airbag member 70 can be actuated in accordance with the actual seated state.

In this embodiment, if it is determined that either one of the upper body and the head of the occupant shakes by a predetermined amount or more based on an image captured in a traveling mode resembling a major collision where the automobile 1 is stopped by braking in either one of a self-driving mode and a driving-support mode, it is determined that the occupant is not capable of sitting firmly. In this case, the settings are changed such that the airbag member 70 and the seatbelt member 71 are quickly actuated or the force for supporting the occupant is increased. Thus, when a major collision actually occurs, the seatbelt member 71 and the airbag member 70 can be actuated to complement the degree by which the occupant sits firmly.

In this embodiment, if it is determined that either one of the upper body and the head of the occupant shakes by a predetermined amount or more based on an image captured in a traveling mode resembling a minor collision where acceleration of a predetermined value or greater acts on the automobile 1, it is determined that the occupant is not capable of sitting firmly. In this case, the settings are changed such that the airbag member 70 and the seatbelt member 71 are quickly actuated or the force for supporting the occupant is increased. Thus, when a minor collision actually occurs, the seatbelt member 71 and the airbag member 70 can be actuated to complement the degree by which the occupant sits firmly.

In this embodiment, even in a case where a braking timing according to either one of a self-driving mode and a driving-support mode is not reached during a normal traveling mode of the automobile 1, the settings for the occupant protection control can be changed based on shaking of either one of the upper body and the head of the occupant in a traveling mode resembling a minor collision where acceleration of a predetermined value or greater acts on the automobile 1 during the normal traveling mode.

The above-described embodiment is merely an example of the disclosure and the disclosure is not limited this embodiment. Various modifications and alterations are possible within the scope of the disclosure.

For example, in the above-described embodiment, the occupant monitoring device 50 is coupled to the vehicle-interior network 21. Alternatively, for example, since the occupant monitoring device 50 is communicable with the wireless communication device 17, the occupant monitoring device 50 may exchange data with the occupant protection device 60. The occupant monitoring device 50 and the wireless communication device 17 may exchange data by a relatively-short-distance communication method compliant with, for example, the IEEE 802.1X standard. In this case, the occupant monitoring device 50 may be detachable from the automobile 1. The occupant monitoring device 50 detachable from the automobile 1 may be positioned and fixed to the occupant compartment 4 by using a mounter.

The invention claimed is:

1. An occupant monitoring device for a vehicle configured to monitor an occupant sitting on a seat provided in the vehicle, the occupant monitoring device comprising:
   a light projector configured to project light toward the occupant sitting on the seat;
   an imaging device configured to capture an image of the occupant sitting on the seat; and
   a processor configured to:
      control the light projector and the imaging device to capture the image of the occupant sitting on the seat;
      determine that a collision of the vehicle is unpredicted and undetected; and
      control, based on the determination that the collision of the vehicle is unpredicted and undetected, the imaging device to capture an image of behavior of the occupant corresponding to one of travel control and behavior of the vehicle so as to change occupant protection control.

2. An occupant protection system for a vehicle, comprising:
   an airbag member;
   a seatbelt member;
   the occupant monitoring device according to claim 1; and
   an occupant protection controller configured to:
      execute the occupant protection control based on the image of the occupant captured by the occupant monitoring device; and
      change settings for the airbag member and the seatbelt member on a basis of the image of the occupant captured by the occupant monitoring device in a state where the collision of the vehicle is unpredicted and undetected,
      wherein the seatbelt member is configured to support the occupant sitting on the seat, and
      wherein, in a case where the collision of the vehicle is detected, the occupant protection controller is further configured to actuate the airbag member and the seatbelt member in the changed settings.

3. The occupant protection system according to claim 2, wherein the processor is further configured to:
   determine a traveling mode of the vehicle is a predetermined behavior-measurement traveling mode; and
   control the imaging device to capture an image of a head of the occupant based on the determination that the traveling mode is the predetermined behavior-measurement traveling mode, and
   wherein the occupant protection controller is further configured to change the occupant protection control in accordance with a position of the head and behavior of the head of the occupant imaged by the imaging device when the traveling mode is the predetermined behavior-measurement traveling mode.

4. The occupant protection system according to claim 2, wherein the occupant protection controller is further configured to:
   control operation of the airbag member and operation of the seatbelt member; and
   change at least one of a start timing for actuating the seatbelt member, a support strength of the seatbelt member, a start timing for releasing the seatbelt member, a start timing for deploying the airbag member, a position of deployment of the airbag member, a direction of deployment of the airbag member, a size of deployment of the airbag member, a speed of deployment of the airbag member, or firmness of the airbag member when deployed, based on a position of a head and behavior of the head of the occupant in the captured image.

5. The occupant protection system according to claim 3, wherein the occupant protection controller is further configured to:
control operation of the airbag member and operation of the seatbelt member; and
change at least one of a start timing for actuating the seatbelt member, a support strength of the seatbelt member, a start timing for releasing the seatbelt member, a start timing for deploying the airbag member, a position of deployment of the airbag member, a direction of deployment of the airbag member, a size of deployment of the airbag member, a speed of deployment of the airbag member, or firmness of the airbag member when deployed, based on the position of the head and the behavior of the head of the occupant in the captured image.

6. The occupant protection system according to claim 4, wherein
the occupant protection controller is further configured to determine that the occupant is capable of sitting firmly in accordance with one of behavior of an upper body and the behavior of the head of the occupant in the image captured by the imaging device, and
based on the determination that the occupant is capable of sitting firmly, the occupant protection controller is further configured to delay the start timing for actuating the seatbelt member, increase the support strength, advance the start timing for releasing the seatbelt member, delay the start timing for deploying the airbag member, increase the speed of deployment of the airbag member, or increase the firmness of the airbag member when deployed, as compared with a case where the occupant is not capable of sitting firmly.

7. The occupant protection system according to claim 5, wherein
the occupant protection controller is further configured to determine that the occupant is capable of sitting firmly in accordance with one of behavior of an upper body and the behavior of the head of the occupant in the image captured by the imaging device, and
based on the determination that the occupant is capable of sitting firmly, the occupant protection controller is further configured to delay the start timing for actuating the seatbelt member, increase the support strength, advance the start timing for releasing the seatbelt member, delay the start timing for deploying the airbag member, increase the speed of deployment of the airbag member, or increase the firmness of the airbag member when deployed, as compared with a case where the occupant is not capable of sitting firmly.

8. The occupant protection system according to claim 4, wherein the occupant protection controller is further configured to change one of the position of deployment of the airbag member, the direction of deployment of the airbag member, and the size of deployment of the airbag member in accordance with one of a position of an upper body or the position of the head of the occupant in the image captured by the imaging device such that the airbag member deploys in a direction and to a position where one of the upper body and the head of the occupant is expected to tilt in response to an input of the collision.

9. The occupant protection system according to claim 5, wherein the occupant protection controller is further configured to change one of the position of deployment of the airbag member, the direction of deployment of the airbag member, and the size of deployment of the airbag member in accordance with one of a position of an upper body or the position of the head of the occupant in the image captured by the imaging device such that the airbag member deploys in a direction and to a position where one of the upper body and the head of the occupant is expected to tilt in response to an input of the collision.

10. The occupant protection system according to claim 2, wherein
the occupant protection controller is further configured to determine one of an upper body and a head of the occupant shakes by a predetermined amount or more based on an image captured in a traveling mode in which the vehicle is stopped by braking in one of a self-driving mode and a driving-support mode, and
the occupant protection controller is further configured to perform, based on the determination that one of the upper body and the head of the occupant shakes by the predetermined amount or more, a changing process to quickly start actuating the airbag member and the seatbelt member or to increase a force for supporting the occupant.

11. The occupant protection system according to claim 3, wherein
the occupant protection controller is further configured to determine one of an upper body and the head of the occupant shakes by a predetermined amount or more based on an image captured in a traveling mode in which the vehicle is stopped by braking in one of a self-driving mode or a driving-support mode, and
the occupant protection controller is further configured to perform, based on the determination that one of the upper body and the head of the occupant shakes by the predetermined amount or more, a changing process to quickly start actuating the airbag member and the seatbelt member or to increase a force for supporting the occupant.

12. The occupant protection system according to claim 2, wherein
the occupant protection controller is further configured to determine one of an upper body and a head of the occupant shakes by a predetermined amount or more based on an image captured in a traveling mode in which acceleration of a predetermined value or greater acts on the vehicle, and
the occupant protection controller is further configured to perform, based on the determination that one of the upper body and the head of the occupant shakes by the predetermined amount or more, a changing process to quickly start actuating the airbag member and the seatbelt member or to increase a force for supporting the occupant.

13. The occupant protection system according to claim 3, wherein
the occupant protection controller is further configured to determine one of an upper body and the head of the occupant shakes by a predetermined amount or more based on an image captured in a traveling mode in which acceleration of a predetermined value or greater acts on the vehicle, and
the occupant protection controller is further configured to perform, based on the determination that one of the upper body and the head of the occupant shakes by the predetermined amount or more, a changing process to quickly start actuating the airbag member and the seatbelt member or to increase a force for supporting the occupant.

14. The occupant protection system according to claim 2, wherein, based on the occupant protection controller is capable of acquiring shaking of one of an upper body and a head of the occupant based on an image captured when the vehicle is stopped by braking in one of a self-driving mode and a driving-support mode, the occupant protection controller is further configured to change the occupant protection control based on the shaking of one of the upper body and the head of the occupant during the braking of the vehicle, and wherein, based on the occupant protection controller is not capable of acquiring the shaking of one of the upper body and the head of the occupant based on the image captured when the vehicle is stopped by braking in one of the self-driving mode and the driving-support mode, the occupant protection controller is further configured to change the occupant protection control based on the shaking of one of the upper body and the head of the occupant in a traveling mode in which acceleration of a predetermined value or greater acts on the vehicle.

15. The occupant protection system according to claim 3, wherein, based on the occupant protection controller is capable of acquiring shaking of one of an upper body and the head of the occupant based on an image captured when the vehicle is stopped by braking in one of a self-driving mode and a driving-support mode, the occupant protection controller is further configured to change the occupant protection control based on the shaking of one of the upper body and the head of the occupant during the braking of the vehicle, and wherein, based on the occupant protection controller is not capable of acquiring the shaking of one of the upper body and the head of the occupant based on the image captured when the vehicle is stopped by braking in one of the self-driving mode and the driving-support mode, the occupant protection controller is further configured to change the occupant protection control based on the shaking of one of the upper body and the head of the occupant in a traveling mode in which acceleration of a predetermined value or greater acts on the vehicle.

* * * * *